US006592761B2

(12) United States Patent
Wofford

(10) Patent No.: US 6,592,761 B2
(45) Date of Patent: Jul. 15, 2003

(54) BIOLOGICAL WASTE WATER TREATMENT SYSTEM

(76) Inventor: Charles Wofford, Rt. 1, Box 1611-21, Shell Knob, MO (US) 65747

( * ) Notice: Subject to any disclaimer, the term of this patent is extended or adjusted under 35 U.S.C. 154(b) by 0 days.

(21) Appl. No.: 10/166,925

(22) Filed: Jun. 11, 2002

(65) Prior Publication Data

US 2002/0179509 A1 Dec. 5, 2002

Related U.S. Application Data

(62) Division of application No. 09/707,584, filed on Nov. 6, 2000, now Pat. No. 6,428,691.

(51) Int. Cl.[7] .............................. E02F 3/04; C02F 3/32
(52) U.S. Cl. ...................... 210/602; 210/605; 210/617; 210/747; 52/741.12
(58) Field of Search ................... 210/150, 151, 210/170, 259, 299, 532.2, 602, 605, 617, 747; 52/741.11, 741.12

(56) References Cited

U.S. PATENT DOCUMENTS

| 853,217 | A | * | 5/1907 | Bordigoni | 210/150 |
|---|---|---|---|---|---|
| 978,889 | A | * | 12/1910 | Imhoff | 210/532.2 |
| 3,494,463 | A | * | 2/1970 | Vermette | 210/151 |
| 3,770,623 | A | * | 11/1973 | Seidel | 210/151 |
| 3,894,355 | A | * | 7/1975 | Carothers | 210/602 |
| 4,009,105 | A | | 2/1977 | Jeris | 210/107 |
| 4,088,571 | A | | 5/1978 | Helgesson | 210/17 |
| 4,153,510 | A | | 5/1979 | Messing et al. | 195/59 |
| 4,415,450 | A | * | 11/1983 | Wolverton | 210/617 |
| 4,454,038 | A | | 6/1984 | Shimodaira et al. | 210/150 |
| 4,710,295 | A | * | 12/1987 | Zabel | 210/532.2 |
| 4,824,287 | A | * | 4/1989 | Tracy | 210/532.2 |
| 4,895,645 | A | * | 1/1990 | Zorich, Jr. | 210/170 |
| 4,925,552 | A | | 5/1990 | Bateson et al. | 210/150 |
| 5,049,265 | A | * | 9/1991 | Boyd et al. | 210/150 |
| 5,062,958 | A | | 11/1991 | Bateson et al. | 210/611 |
| 5,352,357 | A | | 10/1994 | Perry | 210/150 |
| 5,437,786 | A | * | 8/1995 | Horsley et al. | 210/170 |
| 5,707,513 | A | * | 1/1998 | Jowett et al. | 210/150 |
| 5,958,239 | A | * | 9/1999 | Sing | 210/170 |
| 6,200,469 | B1 | * | 3/2001 | Wallace | 210/602 |
| 6,238,563 | B1 | * | 5/2001 | Carroll, II et al. | 210/151 |
| 6,277,274 | B1 | * | 8/2001 | Coffman | 210/602 |
| 6,287,469 | B1 | * | 9/2001 | Ashburn et al. | 210/151 |

* cited by examiner

Primary Examiner—Christopher Upton
(74) Attorney, Agent, or Firm—Lathrop & Gage, L.C.

(57) ABSTRACT

The present invention relates to a compact, environmentally benign onsite waste water treatment and disposal system installed secondary to conventional primary treatment process. It is a method and apparatus for the biological purification and natural disposal of liquid wastes using a secondary single pass trickling filter in conjunction with an evapotranspiration absorption (ETA) tertiary disposal bed.

3 Claims, 6 Drawing Sheets

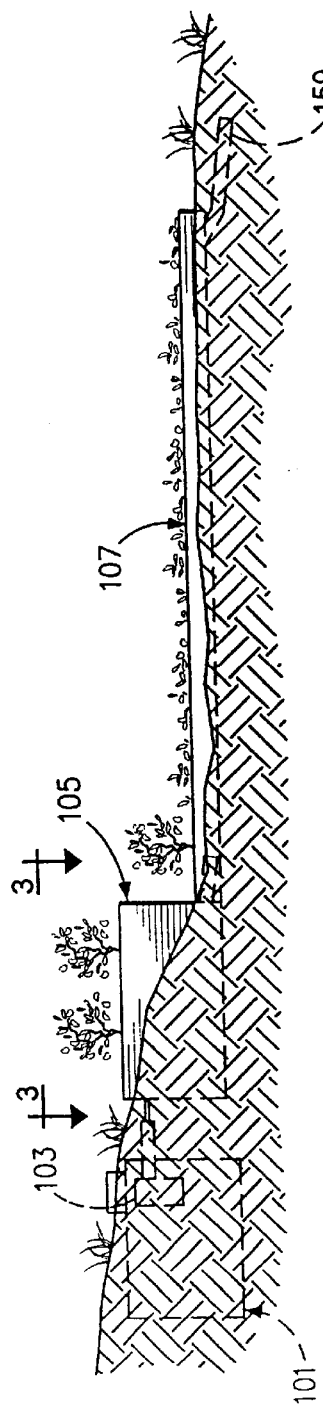
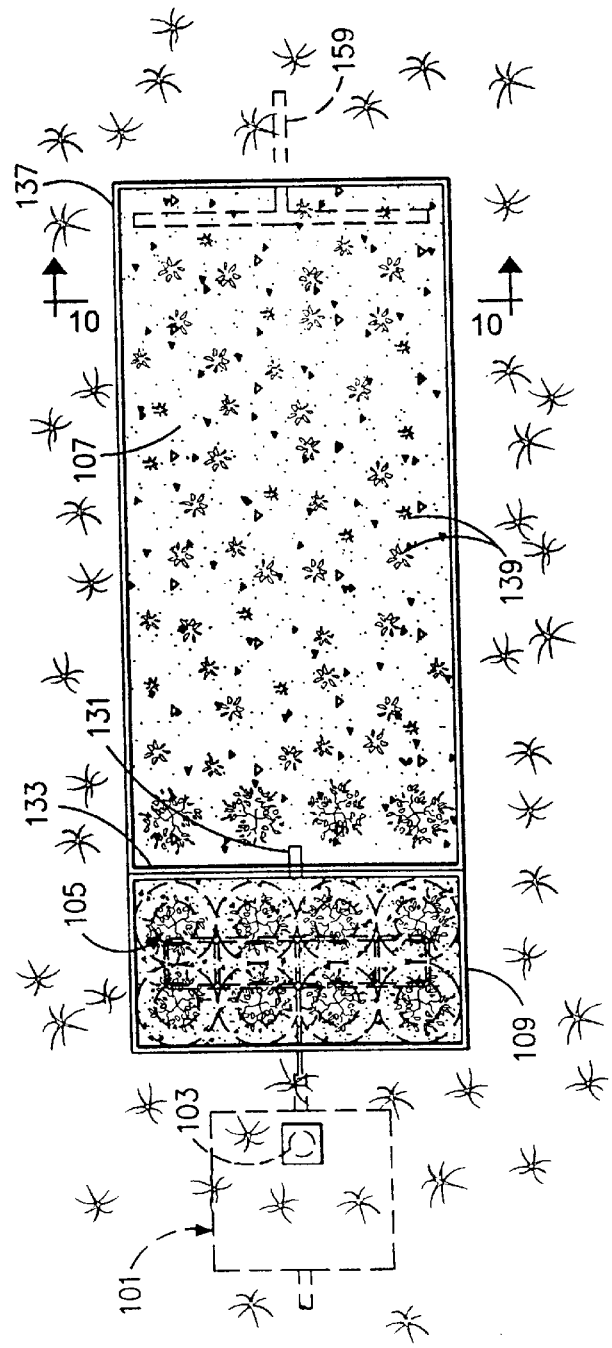

BIOLOGICAL WASTE WATER TREATMENT SYSTEM

This is a division of application Ser. No. 09/707,584, filed Nov. 06, 2000, now U.S. Pat. No. 6,428,691.

FIELD OF INVENTION

The present invention relates to a compact, environmentally neutral biological waste water treatment and disposal system.

BACKGROUND OF THE INVENTION

Waste water, or sewage, produced from residential and commercial sources must be treated to remove environmentally adverse components prior to introduction into ground or surface waters. Significant health risks arise from human exposure to untreated waste water predominantly resulting from the presence of fecal coliform. While most cities and towns treat waste water by processing it through an active mechanical and chemical wastewater treatment plant, many "on site" residential treatments systems, primarily septic tanks, are used in rural or remote settings.

The first stage of "on site" treatment occurs at the septic tank, which serves as combined settling and skimming tank in which primary treatment of residential wastewater occurs. When water tight and structurally sound, a septic tank acts as an unheated, unmixed anaerobic digestion chamber where bacteria attacks and decomposes solids and particulate matter suspended in the waste water. The primary purpose of the septic tank is to separate solids, or sludge, from the liquids, and to provide storage for the sludge during the active decomposition process. As separation of the solids occurs, the liquid, or effluent, is passed to a secondary treatment stage.

A variety of secondary treatment systems have been used in conjunction with septic tanks, including, but not limited to: disposal fields, lateral lines, intermittent sand filters, recirculating granular-medium filters, and shallow-trench, sand-filled, pressure-dosed disposal fields. By far, the most common secondary septic treatment includes subsurface-soil absorption. A subsurface-soil absorption system, or leach field, consists of a series of narrow, relatively shallow trenches filled with a porous medium such as gravel. Porous material provides structure to the leach field, increases effluent water treatment, distributes effluent to the infiltrative soil surfaces and provides temporary storage capacity during peak flows.

Septic tank effluent is transported and applied to the disposal field by intermittent gravity flow or by periodic dosing by hydraulic pump or dosing siphon. Effluent discharged to the disposal field infiltrates into the soil primarily through the side-walls of the trench. Once effluent enters the unsaturated soil zone between the ground surface and the groundwater or bedrock, known as the vadose zone, flow is dictated by soil and bedrock conditions. Gravity will force the effluent over soil particle surfaces and within capillary pores where the effluent eventually finds its way into groundwater courses.

Groundwater contamination commonly occurs because effluent does not receive enough "treatment" between the septic tank and the groundwater course. It is common to find high fecal coliform levels in groundwater near septic tanks, leach fields and lateral lines. Typical disposal field treatment occurs as the effluent flows over and through the porous medium used in the disposal field trenches and as it infiltrates and percolates through the soil. Generally, the porous medium of the leach field acts as a submerged anaerobic filter under continuous inundation of effluent, and as an aerobic trickling filter under periodic application of effluent.

Intermittent gravity flow application of effluent in the leach field causes a biomat to develop progressively on any infiltrative surfaces. Once the biomat is in place, it serves as a biological treatment unit and as a mechanical and biological filter. Under this condition, the leach field environment is usually anaerobic due to relatively high organic and solid loading of the leach field. However, biological treatment occurs more rapidly under aerobic conditions than under anaerobic conditions. Therefore, it is usually desirable to use periodic dosing of a large area leach field to prevent accumulation of a dense biomat. Periodic dosing facilitates maximum effluent treatment, under aerobic conditions, as the effluent moves through the coarse leach field material in a thin layer and through the soil vadose zone under unsaturated flow conditions.

Another effluent treatment method utilizes sand filters. Particularly, intermittent sand filters are shallow beds of sand provided with a surface oriented effluent distribution system and an underlying drainage system. Effluent from the septic tank is periodically applied across the surface of the sand bed where gravity pulls it downward through the sand where it undergoes physical, chemical and biological transformation. Suspended solids are removed by mechanical straining and sedimentation. Bacteria colonized within the sand grows by autofiltration and increases removal of suspended solids from the effluent. Microorganisms in the sand beds convert ammonia to nitrate and remove biological oxygen demand (BOD) under aerobic conditions. Anaerobic bacteria which coexist in the aerobic environment also bring about denitrification (conversion of nitrate to nitrogen gas) which results in significant loss of nitrogen from the effluent. While effective in secondary treatment of waste water, sand bed are difficult to maintain due to particulates clogging the filter which affects the aerobic condition of the site.

Lateral lines are yet another secondary effluent disposal method, quite similar in application to a leach field. Rather than having a field, trench or pit, pipes are connected to the septic tank and channel effluent into contact with the soil vadose zone. Usually, the lateral lines are filled with a porous medium such as gravel, and operate under the same principles as the leach field, albeit over a greater area. Due to the relatively small diameter of a lateral line pipe, typically 4 to 8 inches, it is often necessary to install a significant linear footage of the pipe to achieve the same magnitude of treatment which can be expected in a leach pit.

Often, between 200 and 500 linear feet of lateral line will be necessary to obtain acceptable treatment levels of septic tank effluent. This often requires accessing the land of an adjacent landowner to satisfactorily install and maintain lateral lines. Due to the endless variations of backyard soil conditions throughout the world, none of the currently available secondary treatment methods can be uniformly applied.

Quite often a shallow layer of soil over bedrock makes a leach pit or sand filter impractical. Likewise, a high groundwater table may make any of the conventional treatment methods undesirable and unsafe. Overflowing the treatment area will decrease the effectiveness of treatment and may result in diminishing microbial growth. Small parcels of property, such as are often found in rural towns financially incapable of installing and maintaining a treatment plant, may make lengthy lateral lines undesirable.

Further, each of the conventional methods of treatment requires extensive excavation not only at the installation phase, but also in the event of failure, or for necessary periodic maintenance.

Further, each of these conventional disposal fields, leach fields, lateral lines and sand filters, tend to adversely impact the environmental under certain conditions, including: shallow soil over bedrock, exceeding quick or slow soil percolation rates, high groundwater levels, on steep slopes and where treatment must occur in a limited area. Under any of these conditions, effluent might reach the surface or groundwater before treatment occurs. The present invention achieves unexpected levels of treatment when compared to traditional systems.

It is desirable to have a system which easy to repair and any needs little maintenance. As the system is not buried, as is common with leach fields and sand filters, it is not necessary to excavate the system to work on it. The system offers consistent predictably levels of treatment regardless of native soil conditions. Also, the compact dimensions of the system allows it to be placed in a limited space, for example a small backyard, where lateral lines, or other leach fields, would require an easement or permission of the adjacent land owners.

The apparatus and method of the current invention overcomes each of the stated problems and deficiencies of the known devices for providing secondary treatment waste water.

SUMMARY OF THE INVENTION

The present invention relates to a compact, environmentally neutral onsite biological waste water treatment and disposal system installed down-flow from a conventional primary treatment process, such as a septic tank, and a conventional mechanical filter. More particularly, the present invention relates to an apparatus and method for the biological purification and natural disposal of liquid wastes using a secondary single pass trickling filter in conjunction with an evapotranspiration absorption (ETA) tertiary disposal bed. This invention replaces conventional secondary waste water treatment mechanisms, such as leach fields, sand filters and lateral lines.

It is preferred that both the secondary and tertiary systems are composed primarily of synthetic (man-made) materials, which may then be covered by various horticultural (plant and planting) materials. The synthetic materials utilized within the novel filter system are preferably synthetic textile materials which are inert, non-toxic, and non-biodegradable fibrous masses having substantial surface area.

Within the secondary system, synthetic textile materials are housed in cylindrical structures. The cylindrical structures are contained within a housing, typically constructed of wood, treated lumber, plastic or fiberglass. The tertiary system includes synthetic material loosely compacted within a housing similar in composition and configuration to the secondary system.

The trickling filter claimed herein is unique and advances the state of the art in several ways. First, the unique construction layout and extensive use of synthetic materials provides the surface area, aerobic action, and waste water treatment effectiveness of a large and expensive traditional sand filter, yet accomplishes the effect in a very compact filter unit at a fraction of the cost.

Further, the apparatus has far lower maintenance and cost of operation, as its design allows for pure gravity flow in most applications and ordinary use should necessitate little if any maintenance for over extended periods of time. The apparatus is uniquely accessible so that even extraordinary major maintenance or repair can be easily accomplished without digging or the use of heavy equipment, which is a major shortcoming and expense associated with current predominant system types, such as leach fields and lateral lines.

By relying upon the synthetic material of the self-contained filter unit rather than native soils to provide secondary treatment, treatment can be optimized and made consistent for all users, even those residing in areas with soil properties which do not lend themselves to proper treatment of waste water and are currently either underutilized or an ongoing polluter. An advantage of the apparatus is that the trickling filter unit maintains full functionality and treatment effectiveness even with sporadic or intermittent use, contrary to current systems which often fail when sporadically used. This characteristic makes the apparatus a suitable solution for summer or vacation homes and cottages, hunting lodges, government recreational areas, and the like, which tend to have a high failure rate due to sporadic use.

Finally, by being designed specifically to allow for the utilization of construction materials which are also presently considered non-biodegradable waste products, such as scrap polypropylene and used automobile tires, the filter system is in a unique position of being able to offer a partial solution to the significant industrial waste disposal problems while providing cost effective and superior treatment of waste water addressing the global ground water pollution crisis.

The ETA tertiary disposal bed component also advances the state of the art and provides a unique, compact, economical, and practical method of treated effluent disposal. The current preferred method of combined treatment and disposal utilizes a leach field or lateral lines, with performance fluctuating from adequate to totally ineffective depending upon the local soil and environmental conditions. The nearest thing to a current remedy is to over-design the system, requiring ever more linear feet of buried lateral lines at relatively high cost of installation, virtually impossible maintenance, and poor utilization of space.

The ETA tertiary disposal bed of the present invention utilizes synthetic materials in conjunction with natural products to provide a far more consistent and effective effluent dispersal, while maintaining relatively low cost and ease of installation, minimal reliance upon unpredictable soil conditions, and far more compact installation. The compact size and lack of reliance upon native soils permits utilization of effective on-site sewage treatment on properties where traditional systems would be ineffective and/or unfeasible, while the use of synthetics and method of construction means that, in the rare case where maintenance or repair were necessary, it could be easily and cheaply accomplished without the need for further excavation or use of heavy equipment.

Each secondary trickling filter and the ET tertiary disposal bed disclosed herein could be used separately or in a different configuration to augment an existing septic treatment system or to best suit site conditions and requirements. The combined use of natural and man-made materials, when properly constructed, produce an overall waste water treatment system that is cost effective, ecologically friendly, provides high levels of water purification, provides final disposal thereof, requires very little space, and is simple and relatively inexpensive to operate and maintain.

Further, testing shows that the system is very easy to maintain and does not have clogging problems such as those that often occur in other waste water filtering systems, particularly sand bed filters. The biological state of the trickling filter is easy to start and maintain, and in the event of contamination which compromises the anaerobic treatment environment, correction can likely be made by simply flushing the system with neutralizing agent or water.

The treatment level achieved in waste water treated through the trickling filter and ETA bed is unexpected. Testing shows that fecal coliform levels of treated effluent are usually below testing limits and are significantly below the generally acceptable levels in treated municipal waste water effluent. Additionally, testing shows that nitrogen and phosphorus levels are below generally acceptable treated waste water limits, as are total suspended solids and biological oxygen demand (BOD). The neutral treating environment also results in neutral pH of any treated effluent which eventually would reach ground or surface waters.

BRIEF DESCRIPTION OF THE DRAWINGS

FIG. 1 is a side elevation view of the present invention.

FIG. 2 is a top view of the present invention.

DETAILED DESCRIPTION OF THE INVENTION

The present invention relates to a compact, environmentally neutral onsite waste water treatment and disposal system installed secondary to a conventional primary treatment mechanism, such as a septic tank. More specifically, the disclosed invention, is a method and apparatus for the biological purification and natural disposal of liquid Wastes using a secondary single pass trickling filter in conjunction with an evapotranspiration absorption (ETA) tertiary disposal bed.

Referring now to FIGS. 1 and 2, a primary treatment system is necessary to provide pre-treatment of the waste effluent. It is preferred, for best performance and lowest maintenance, that a septic tank 101 and a solids filter 103 (such as the one manufactured and sold under the trade name Zable A300) be installed between the septic tank and the inventive apparatus. Further, the septic tank 101 should be installed as shallow as possible, and on a sloping grade, to reduce the amount of work required to construct the secondary trickling filter 105 and ETA disposal bed 107. This also facilitates operation of the system by gravity flow. A pump, or lift station, may be necessary to move effluent into the trickling filter 105.

Figure 3:
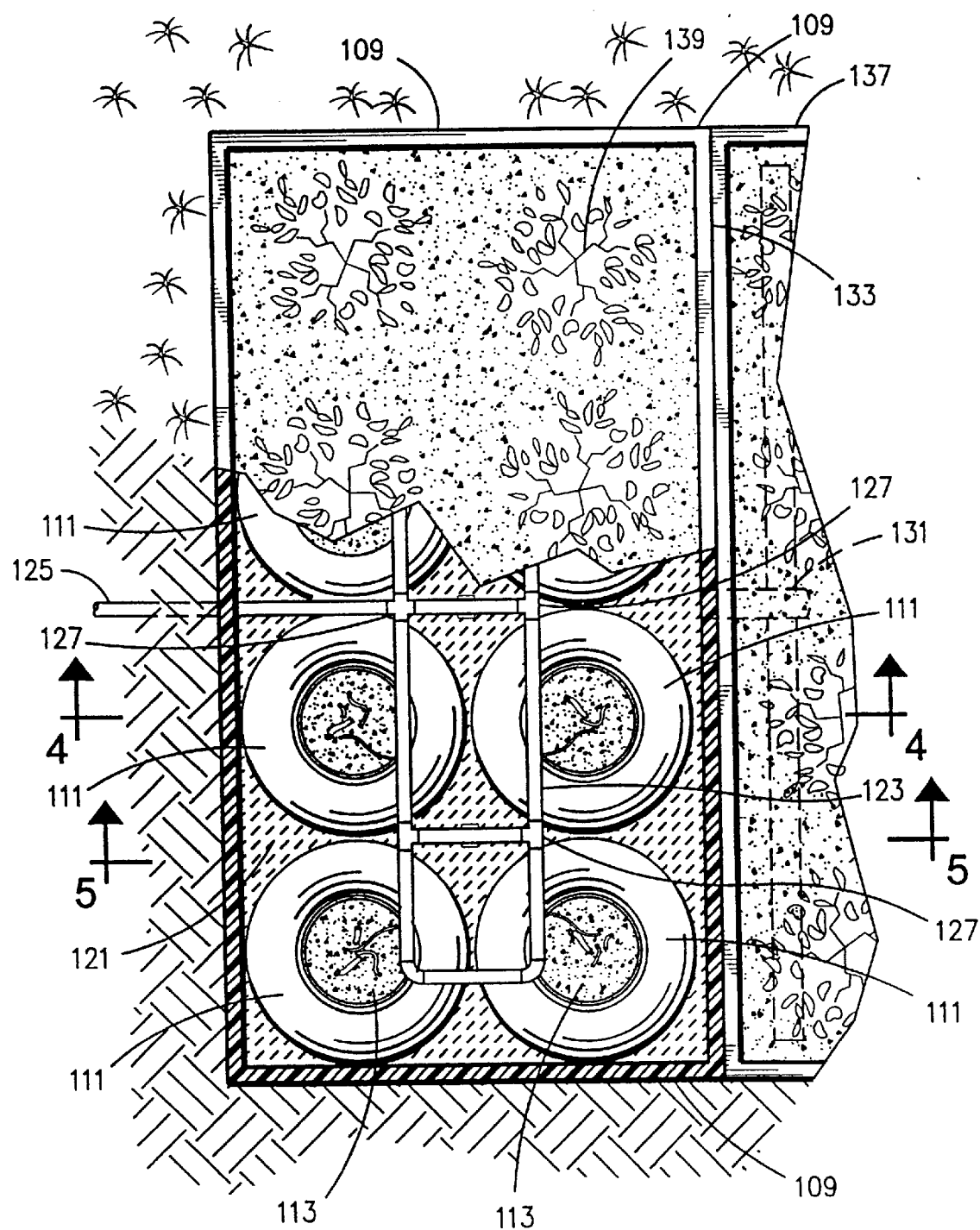
FIG. 3 is a partial fragmentary top view taken along line 3—3 in FIG. 1.

Referring now to FIG. 3, the secondary treatment apparatus is a single pass, gravity trickling filter 105 which may be generally described as having the following essential components:

(1) A containment housing 109, preferably being rectangular and constructed of non-biodegradable material. Preferred materials include plastic or fiberglass which are sufficiently strong to provide reliable containment and location of the filter components. The containment housing 109 will contribute to ease of installation and may be constructed on-site or prefabricated and transported to the site. It is essential that the containment housing 109 is sufficiently deep to contain and protect the internal filter components and that it is provided with a top designed to allow for the introduction of environmental moisture and oxygen.

It is preferred that the containment housing 109 which houses the trickling filter 105 be constructed of plastic in the form depicted in FIG. 3, as this configuration satisfies all of the above requirements while maximizing ease of unit construction, transportation, and installation. The preferred design also allows standardization while retaining flexibility for different foreseen demand loads by being readily connectable in series with additional trickling filters 105 for larger loading requirements. However, the precise mechanism of filter containment may be flexible within these guidelines, and may, for example, be constructed on site by use of sufficient size, strength, resistance to decay, such as railroad ties, concrete blocks or treated lumber, as long as the necessary containment and stabilization is obtained.

(2) A plurality of trickling filter media support structures 111 are generally cylindrical structures of impermeable material. They will be stacked in the containment housing 109, standing in multi-tiered rows and columns, with the number of trickling filter media support structures 111 determined by the expected load to be treated. The trickling filter media support structures 111 will house a synthetic filter biomass media 113 in such a way as to prevent unwanted compression of the media. Further, the trickling filter support structures 111 will retain a sufficient amount of liquid to ensure proper filter biomass media 113 saturation, through wicking action, without undue submersion of the media 113. The support structures 111 will provide sufficient room to ensure adequate oxygen circulation and exposure to allow aerobic bioremediation to take place. Finally, the support structures will provided additional surface area treatment.

Figure 4:
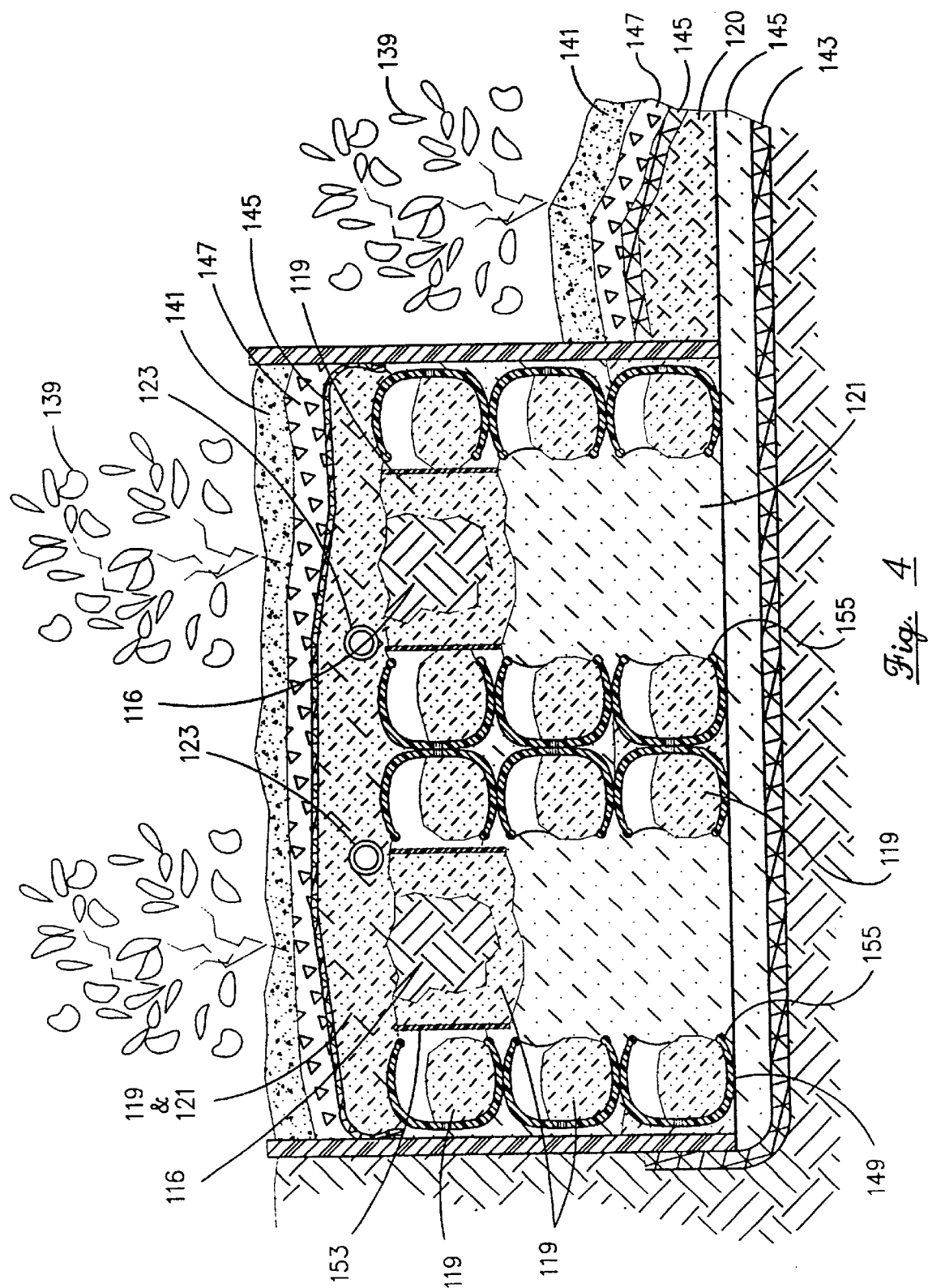
FIG. 4 is a partial sectional view taken along line 4—4 in FIG. 3.
Figure 5:
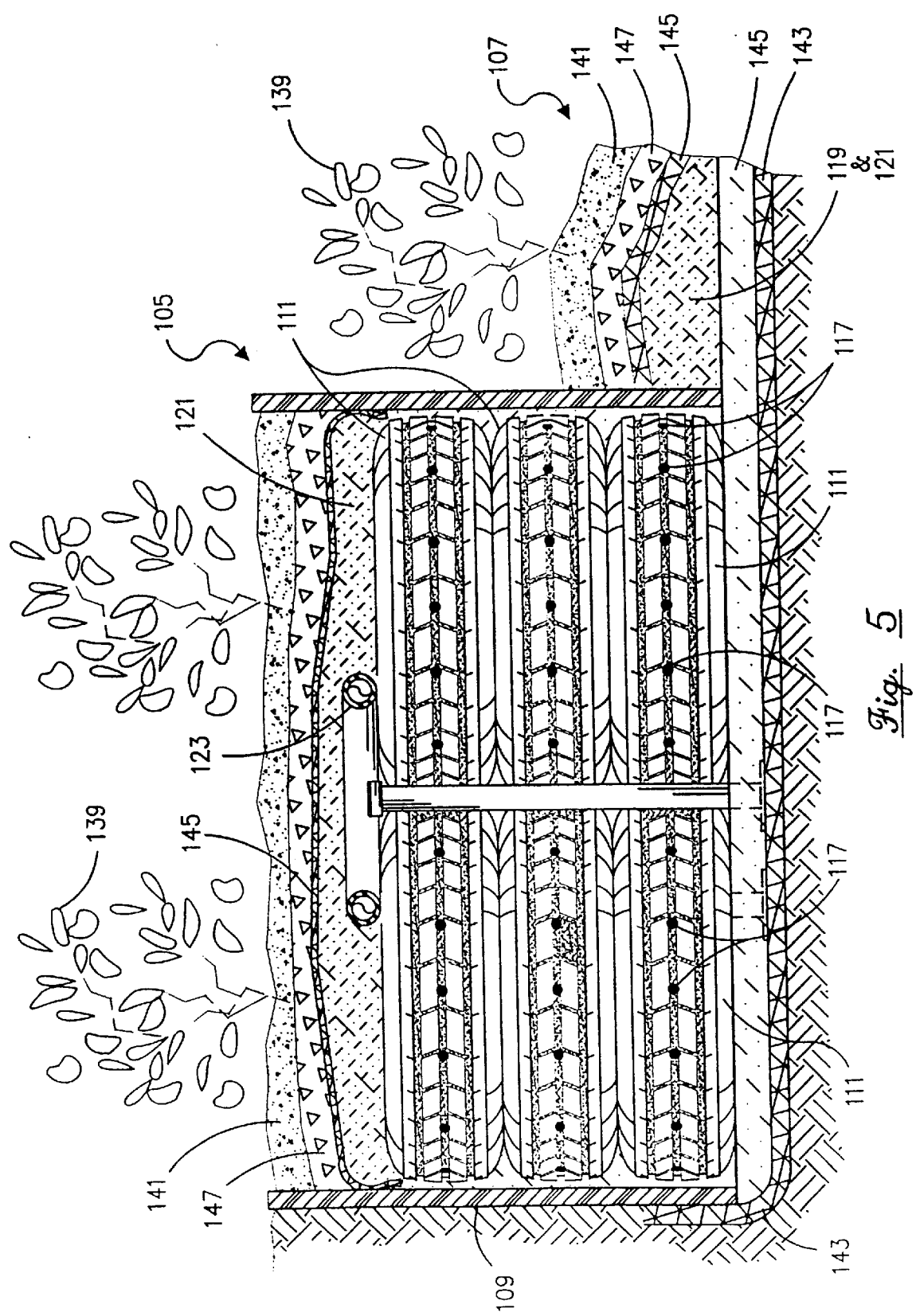
FIG. 5 is a partial sectional view taken along line 5—5 in FIG. 3.
Figure 6:
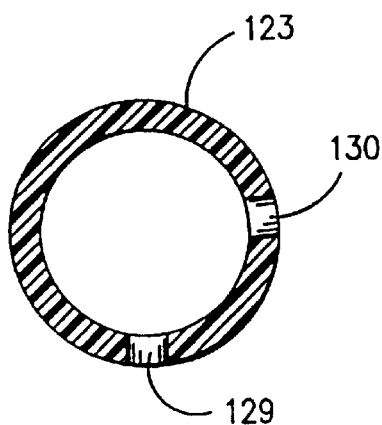
FIG. 6 is a cross sectional view of the distribution manifold pipe at the position of placement over a trickling filter support structure having a distribution opening and a venting opening.
Figure 7:
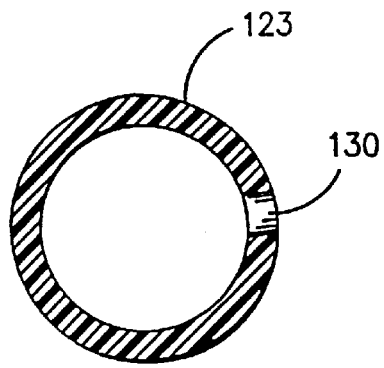
FIG. 7 is a cross sectional view of the distribution manifold pipe at the position of connection placement over the trickling filter support structure having only a venting opening.
Figure 8:
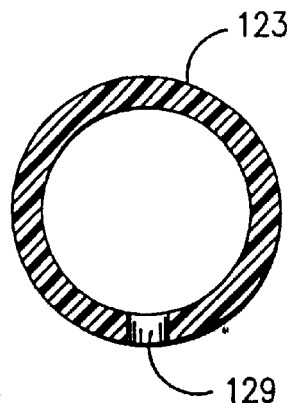
FIG. 8 is a cross sectional view of the distribution manifold pipe at the position of connection placement over the trickling filter support structure having only a distribution opening.
Figure 9:
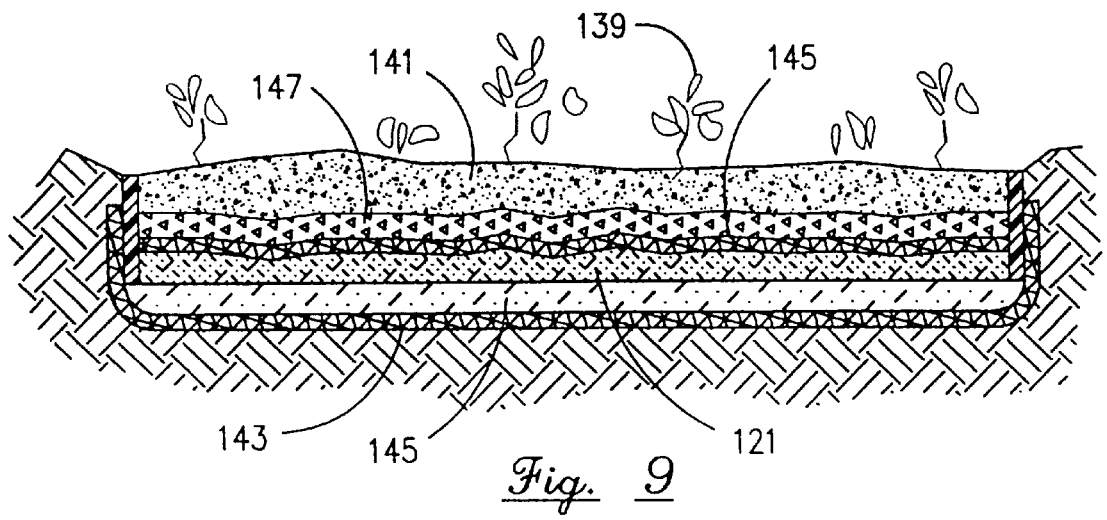
FIG. 9 is a cross sectional view taken along line 10–10 in FIG. 2.

The shape of the trickling filter support structures 111 can best be described by outlining the preferred construction method, which includes vertically stacking used automobile tires 111 (hereinafter the reference numeral 111 will be used to designate the preferred trickling filter support structure, namely, automobile tires), on their sides one upon the other so as to form the required cylinder. The used tires 111 are desirable in that they: (1) provide separate, compartmentalized chambers in which to hold the filter media 113; (2) prevent unwanted compression; (3) are themselves impermeable and shaped in such a way as to hold an appropriate amount of liquid without danger of submersing the media 113 (which would essentially halt the desired aerobic action); and (4) provide a significant amount of intrinsic surface area in the path liquid to be treated must follow in flowing over and around the structure. Ideally, if used tires 111 are used to construct the trickling filter support structures 111, they should have holes 117 of at least one-half inch (12 mm) diameter drilled about every six to twelve inches around the circumference, along the center of the tread of each tire 111 to aid oxygen circulation and exposure, as shown in FIG. 5. The number of trickling filter support structures 111, as well as the height of the structures (e.g., number of tires 111 per cylinder) may be varied as needed to attain adequate treatment of waste water. In the preferred configuration, as shown in FIGS. 4 and 5, it is recommended that a minimum support structure equivalent to three columns each of three tires 111 high be utilized for the expected loading anticipated from a single family dwelling.

The support structures 111 may actually be constructed of any impermeable, non-biodegradable, relatively inert material which can be made to conform to a shape substantially mimicking the column of tires 111 mentioned above. Construction from used automobiles tires 111 remains the preferred construction method as they meet availability, cost effectiveness, shape and structural requirements while affording an opportunity to remove unwanted used auto tires 111 from the current waste stream.

(3) The synthetic filter biomass media 113 includes a primary filter media 119, located in the trickling filter support structures 111, which is comprised of synthetic textile materials which are inert, non-toxic, and non-biodegradable fibrous masses having very fine fibers (small diameter) and high surface area and which are contained primarily in the tires 111. It is preferred that the primary filter media 119 comprises polypropylene, polyester or a combination of the two materials. Whatever material is selected, it should have the approximate appearance and consistency of loosely compacted cotton or bulk cotton. Particularly well suited as primary filter media 119 to the intended application is waste byproduct from the manufacture of products such as air filters. However, any suitable synthetic material with substantially the same characteristics can be used.

The primary filter media 119 is inserted into the cavity 157 of the tires 111 under moderate compression, allowing room for expansion and air circulation, and due to its unique physical characteristics, forms an excellent and predictable habitat for growth and function of the aerobic biomass, with an extremely low rate of declining effectiveness. The wicking action of the synthetic fibers provide superior distribution of liquid wasted throughout each cavity 157 and an amount of surface area far greater than an equivalent volume of sand or other traditional media. Further, the primary filter media 119 allows multi-directional movement of the waste water, due to gravity flow, wicking and absorption.

(4) The synthetic filter biomass media 113 also includes a secondary filter media 121, which is comprised of synthetic textile materials which are inert, non-toxic, and non-biodegradable fibrous masses having relatively coarse fibers with more structure than the primary filter media, yet maintaining a high surface area. This material should have the approximate appearance and consistency of mat or scouring pads, and the preferred source is the waste byproduct from the manufacture of products such as scouring pads, but could be any suitable synthetic material with substantially the same characteristics. The secondary filter media 121 is inserted between and around the trickling filter media support structures 111 under light to moderate compression. The primary purpose of the secondary filter media 121 is to fill the voids and provide some mass between the media support structures 111 to minimize entry of soil, mulch, or other external material which could diminish filter effectiveness. Importantly, the secondary filter media 121 remains sufficiently permeable to allow entry of environmental moisture and oxygen and provides some additional surface area for the aerobic biomass with minimal decline in effectiveness over time.

(5) A distribution manifold 123 provides for the entry of pre-treated waste water from the septic tank 101, or other source, into the containment housing 109 substantially near the top of the containment housing 109. The manifold 123 is positioned to uniformly distribute the waste water over each of the filter support structures 111.

The best method contemplated for achieving consistent and uniform distribution is the use of a distribution manifold 123 constructed in the shape and manner depicted in FIGS. 2 and 3. This distribution manifold 123 should be constructed of an impervious and non-biodegradable material, such as plastic, which may be easily leveled with the horizontal plane, with a primary channel or orifice 125 to carry inflow from the outside source into the body of the filter housing, and a distribution fitting 127 to allow equal flow outward to a location directly over the filter support structures 111. Inflow would be dispensed via dispensing openings 129 and venting openings 130, in the manifold, preferably about three-sixteenth to one-quarter of an inch in diameter. Vent openings 130, having similar dimensions, will also be provided in the manifold 123 to prevent vapor lock.

The dispensing openings 129 are located substantially on the bottom of the distribution manifold 123 and the venting openings 130 are located substantially on the horizontal center of the distribution manifold 127 to aid in even distribution as shown in FIGS. 6–9. The preferred construction for a serially connected model would also provide for a plugged channel to continue to the opposite side of the containment housing 109, in order to enable simple and uniform production, while allowing for simple connection to a second filter unit in series when the situation called for it. The distribution manifold 123 could be constructed from one inch diameter PVC pipe or similar materials in substantially the same shape, so long as the design meets the requirements noted above.

(6) An outlet pipe 131, fixed to the containment housing 109, may be provided to allow an exit for treated liquid for transfer to the ETA bed 107 or other dispersal system, or an intermediate wall 133 between the trickling filter 105 and the disposal bed 107 may be installed off of the containment housing floor 135, to allow treated effluent to pass from the trickling filter 105 into the disposal bed 107. If an outlet pipe 131 is used, a manifold pipe should be attached at right angles to the outlet pipe 131. The holes provided along the length of the manifold pipe will provide uniform liquid flow across the width of the upstream end of the ETA bed 107.

(7) A dispersal system, preferably an evapotranspiration absorption tertiary disposal bed 107, having a ETA housing 137 similar in construction to the containment housing 109 is connected downstream from the trickling filter 105. Secondary filter media 121 and the presence of green, leafy plants 139 which are planted on the disposal bed 107 facilitate evaporation of the treated effluent as well as plant transpiration of waste water absorbed as a function of the nutritional uptake cycle of the plant life. An ETA bed outlet 159 may be used to connect the system to lateral lines in order to meet building code requirements, or for attaching multiple ETA beds 107.

Figure 10:
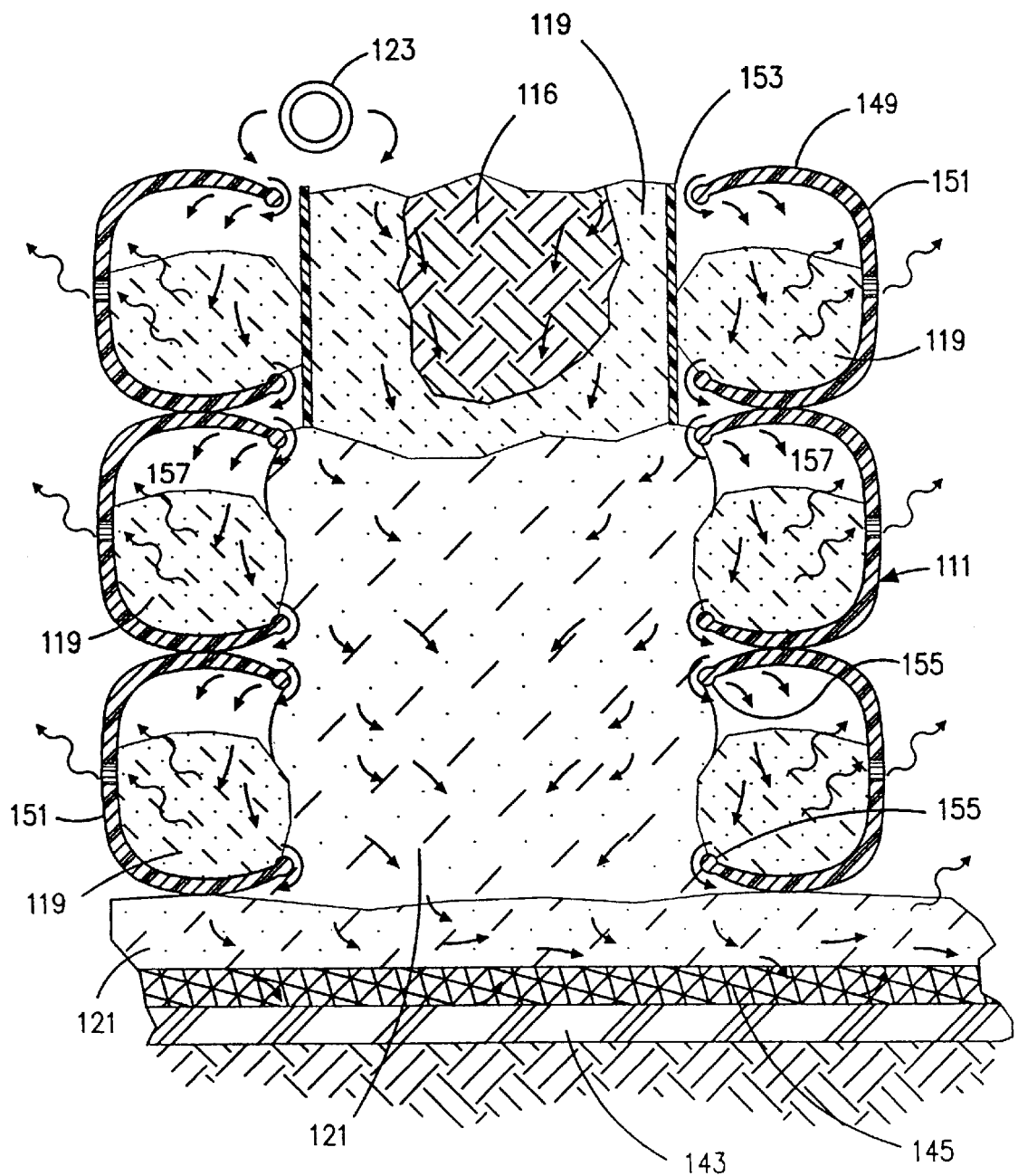
FIG. 10 is a cross sectional view of the secondary treatment system showing the general flow of liquid.

(8) As shown in FIG. 10, a synthetic or natural groundcover 141 is dispersed over the top of the containment housing 109 and over the ETA bed 107. It is preferred that multiple plants 139 be planted on the groundcover so that the root systems of each plant 139 can extend downward into the trickling filter 105 or ETA bed 107.

The secondary trickling filter 105 is unique and advances the state of the art by use of a unique construction layout and extensive use of certain non-biodegradable, synthetic materials which provide the surface area, aerobic action, and waste water treatment effectiveness of a large and expensive traditional sand filter, yet accomplishes the effect in a very compact filter unit at a small fraction of the cost. The design allows for pure gravity flow in most applications and lower ongoing maintenance and cost of operation. It is uniquely accessible so that even extraordinary major maintenance or repair can be easily accomplished without digging or the use of heavy equipment, and by relying upon the synthetics of the self-contained filter unit rather than native soils to provide secondary treatment, treatment can be optimized and made consistent for all users. Likewise, the ETA tertiary disposal bed 107 component also advances the state of the art by creative and unique utilization of synthetic materials in conjunction with natural constituents, is able to provide a far more consistent and effective effluent dispersal, while maintaining relatively low cost and ease of installation, minimal reliance upon unpredictable soil conditions, and far more compact installation.

Construction and installation of the system is very straightforward. A primary treatment system, such as a septic tank 101 should be installed, as shallow as possible, or as allowed by prevailing installation requirements. A solids filter 103, such as the Zable A300 should be installed, either at the septic tank 101, or in a separate basin. It is preferred that the filter 103 can screen solids down to one thirty-second (1/32) of an inch. An area downstream of the septic tank 101 and filter should be excavated. For a single dwelling residence, the area is preferably about ten (10) feet wide by twenty-six (26) feet long. The depth of the excavation should be about three (3) feet near the septic tank 101 and fall off to at least three and one-half (3½) feet at the opposite end of the excavation to allow for gravitational fall. It should be known that these dimensions can vary greatly depending on capacity needs and physical location requirements. Further, the system works very well on very steep slopes and the fall is not vital to the design and operation of the system, as long as a minimum fall is utilized to facilitate gravity flow.

A containment housing 109 is constructed around the inside perimeter of the excavated area. This containment housing 109 can be constructed of plastic, polyvinyl chloride, railroad ties, treated lumber, concrete blocks, or other suitable material. A water-proof liner 143 is installed near the upstream end of the containment housing 109. If a sump pump, or lateral line pickup is installed in the system, the liner 143 should underlie these devices. A geo-textile liner 145 is then installed over the entire excavated area and should extend about one (1) foot up each side of the containment housing 109 to provide a seal and prevent effluent leakage. If the system is prefabricated from plastic or fiberglass having a solid bottom, a geo-textile liner is not needed. This construction provides the operating area for both the secondary trickling filter 105 and a disposal bed 107.

The entire layer is then covered with a layer of secondary filter media 121, preferably two (2) to three (3) inches deep. Secondary filter media 121 can be any fibrous synthetic material and would preferably have a consistency similar to a rough scouring pad. Preferably, the secondary filter media 121 will be industrial by-product which would otherwise be considered waste, such as trimmings from synthetic filters, scouring pads, breathing masks, hospital dressings, and so forth. A shallow layer of coarse gravel (or similar material) 147 is then installed over the secondary filter media 121 for ballast.

A plurality of trickling filter media support structures 111 are then placed in the containment housing 109, at the end nearest the septic tank 101. Virtually any impermeable material could be used to form the trickling filter media support structures 111. It is preferred that used tires 111 be used for a variety of reasons. Used tires 111 are a difficult waste product to dispose of and an abundant supply exists. It is possible to obtain the used tires 111 for little if any cost. The shape and size of the automobile tire 111 is very nearly perfect to use in the inventive apparatus as described herein. While the apparatus and method are described herein as using automobile tires 111 for the trickling filter media support structures 111, it should be understood that a variety of structures will function very well in place of the used tires 111, and the reference to automobile tires 111 should not limit the scope and coverage of this invention.

For a three bedroom residence, it is preferred to use eighteen (18) tires 111, placing them near the containment housing 109 wall nearest the septic tank 101, in two rows of three tires 111, stacked three deep. Holes 117 should be drilled in the middle of the tread around the circumference of each tire to facilitate air circulation. Primary filter media 119 is then placed into each tire to substantially fill the available tire cavity 157 formed by the opposing sidewalls 149 and the circumference wall 151, as shown in FIG. 11.

Primary filter media 119 can be any fibrous synthetic material, and would preferably have a consistency similar to cotton. Preferably, the primary filter media 119 will be industrial by product which would otherwise be considered waste, such as ground air filter material.

Once the bottom layer of tires 111 are in place, an intermediate wall 133 is constructed at the downstream edge of the last row of tires 111. The wall 133 may be formed of the same material of which the containment housing 109 is constructed, and should be raised off of the bottom of the excavation to facilitate flow of effluent into the downstream disposal bed 107. At this point, primary filter media 119 is forced into all spaces between the outer perimeter of the tires 111 and the containment housing 109. A second layer of tires 111 is added on top of the first layer. All spaces between the outer perimeter of the tires 111, as well as the center of the tires 111, are filled with secondary filter media 121. The third tire layer is added and the space between the outer perimeter of the tires 111 and the containment wall is filled with secondary filter media 121. It is not desirable to fill the center of the top tire 111, although it will not adversely affect the system to do so. Otherwise, bottomless cylindrical containers 153, such as the top portion of a five gallon bucket, are then placed in the center of each top-layer tire 111. This cylinder 153, and the area around the cylinder 153 are then filled with primary filter media 119, with enough room provided for plant material 139 and attendant potting soil 116.

A distribution manifold 123 is constructed so that it passes over the uppermost side of each top-layer tire 111. It is preferable to construct the manifold 123 from one inch PVC pipe. The pipe is connected to the septic tank 101 or filter 103 outlet pipe. The manifold 123 should be leveled to ensure even distribution of the waste water throughout the system. It is preferred to fasten the distribution manifold 123 in place.

As shown in FIGS. 6–9, substantially adjacent to the top surface of each top-layer tire 111, at least one distribution hole 129 should be drilled in the manifold. Preferably, a distribution hole 129 and a vent hole 130 will be provided over each column of tires 111, the vent hole 130 about three-sixteenth (3/16) to one-fourth (1/4) inch in diameter, completely through a side of the pipe and parallel to the upper surface of the tire. Each distribution hole 129 should be about three-sixteenth (3/16) to one-fourth (1/4) inch in diameter in the lower surface of the manifold pipe, and is perpendicular to the vent hole 130 which is preferably oriented generally in the direction of the center of the upper tire 111. It is recommended to purge the manifold system 123 prior to use to remove any drilling remnants.

A mixture 120 of primary filter media 119 and secondary filter media 121 is then placed over and around the tires 111 and the distribution manifold 123, except for within the cylindrical containers 153. A geo-textile weed barrier 145 is used to cover the entire secondary trickling filter 105 and is tucked into the sides between the tires 111 and the containment housing 109. An "X" pattern is then cut into the geo-textile barrier 145 over each of the cylindrical containers 153 in each top-layer tire 111. The four points of each "X" are folded back to reveal the underlying cylindrical containers 153. It is preferred to plant, in a conventional manner, a two to three gallon size evergreen shrub 139, or other suitable greenery 139, including a quantity of dirt or potting soil 116, in the cylindrical containers 153 and then replace the geo-textile material 145.

A layer of gravel or rock 147, preferably lava rock, is layered over the geo-textile barrier 145 to a depth of about one (1) inch, primarily as a ballast. It is then desirable to cover the rock or gravel 147 with one (1) to two (2) inches of mulch, bark chips or other suitable landscape material 141, around the green plants 139 to the perimeter of the containment housing 109.

As shown in FIG. 10., an additional containment housing 137 forms the disposal bed 107, such as the preferred evapotranspiration tertiary disposal bed 107. Adjacent the intermediate wall 133 which contains the trickling filter 105, a layer of primary filter media 119, secondary filter media 121, or a combination of both, is formed, about six (6) inches in depth. This can be tapered off toward the downstream end of the disposal bed 107. The entire bed 107 is first covered with geo-textile material 145, about one (1) inch of lava rock 147 for ballast, then about three (3) inches of mulch or bark chips 147. Various plants 139 and ground covers may be planted in the disposal bed 107 by forming holes through the mulch or bark chips 141, gravel or lava rock 147 and geo-textile material 145, and providing potting soil or dirt adjacent each plant's roots.

The outer perimeter of any exposed portion of the containment housings 109 and 137 must be graded or mounded to prevent surface water runoff from entering the system and affecting treatment. It is preferred that a small amount of bentonite is placed around the outside perimeter of the containment housings 109 and 137 prior to backfilling, to prevent seepage.

Generally, the septic tank 101, or similar primary treatment, provides the settling out area, anaerobic digestion chamber and surge flow equalization. It should be noted that the septic tank 101 outlet flow is most always in the form of trickling flows even though the inlet flow is sometimes in large doses. This can be explained by the surface tension characteristics of water and its ability to mound slightly when added to and then dispense the additional water slowly over time.

The desired mechanical filter 103 between the septic tank 101 and the trickling filter 105 forces the septic tank 101 to treat wastewater longer than if free flow is allowed. Further, the filter 103 prevents any floating debris from entering the distribution manifold 123, where it might clog the openings 129. Now referring to FIG. 11, the distribution manifold 123 distributes the filtered effluent over the sidewalls 149 of the top layer of tires 111. One of the benefits of using tires 111 as the trickling filter 105 media support structures, is the unique contour of the tire sidewall 149. The shape of the sidewall 149 tends to spread the flow outward and toward the center of the tire 111, where the tire bead 155 is located. The tire bead 155 area tends to collect the effluent momentarily before it spills over the edge into the tire, where the pull of gravity and the adhesion of the liquid to the tire surface, allows the liquid to drain into the tire cavity 157 rather than draining down the center of the tire column. As the effluent drips over the bead 155 of the tire and into the tire cavity 157, some of it enters the primary filter media 119 and some of it will pool in the bottom of the tire cavity 157. Liquid in the pool is wicked into the absorbent primary filter media 119. It is this process which breaks down the liquid waste water.

As the waste water enters the system and moves through the tires 111, it undergoes a cycle of adhesion, flowing, dripping, wicking and puddling. This process exposes the liquid to air and the aeration process decomposes the waste and decreases phosphates and nitrates. Further, the green plants 139 arranged on top of the trickling filter 105 start and continue to grow soil microbes which form and grow on the primary filter media 119, secondary filter media 121 and the tires 111 themselves. These microbes also treat and purify the waste water.

When the liquid puddles sufficiently deep in the tire cavity 157, of the upper-most tire 111, it will pool to the lower tire bead 155 and, under adhesion influence, run along the bottom outside sidewall 149 of the upper tire 111 until gravity causes the liquid to fall to the upper outside sidewall 149 of the next lower tire 111 in the stack. The process outlined above is repeated in this second tire 111, and in each remaining tire 111 until the liquid reaches the bottom of the stack. Upon hitting the bottom of the containment housing 109, the liquid moves by gravity and wicking under the intermediate wall 133 and into the disposal bed 107.

Once the liquid enters the disposal bed 107, it encounters the layer of secondary filter media 121 which further treats the waste water by filtering it and aerating it. As the geo-textile covering 145, the layer of lava rock 147 and the bark chips and mulch 141, all lie directly on top of the secondary filter media 121, a significant amount of absorption occurs. Further, green plants 139 which are planted on the surface of the disposal bed 107 absorb the liquid and use it for nourishment. The vast majority of all liquid finding its way to the disposal bed 107 will evaporate or be removed by plant transpiration. (It is this action of evaporation and plant transpiration working together which is called evapotranspiration.)

As the waste water moves through the trickling filter 105 and disposal bed 107, some of it will be absorbed or consumed by the roots of the overlying shrubs and bushes 139. The plants 139 do increase treatment within the system. Further, the plants 139 are an indicator of how the system is operating. As the plants' 139 roots enter the area of the system where there is primary filter media 119, the plants 139 essentially become hydroponic, living off of nourishment derived from the waste water. If any harmful materials enter the sewer, such as chemicals flushed through a toilet system, the plants 139 will change color, wilt or even die. In the event the system becomes contaminated with chemicals, or other harmful materials, it may be necessary to dilute or neutralize the system by flushing it with water or a neutral agent.

EXAMPLES

The following examples are for illustration purposes only and are not meant to limit the claims in any way.

Example 1

An experimental systems was installed at a single family residence using the construction methods described herein. A containment housing 109 was constructed at 4.5 feet wide by 9 feet long and 2 feet high. The trickling filter 105 was constructed from sixteen (16) tires 111, stacked two high in two rows. A water impervious floor 145 was installed and covered with a layer of secondary filter media 121, which was industrial by-product, from the manufacture of clean masks and clean suits, such as those worn by surgeons, which was obtained from 3M Corporation. Primary filter media 119, which was ground air filter by-product obtained from 3M Corporation, was installed in and around the tires 111. The evapotranspiration tertiary absorption bed 107 was constructed 9 feet by 20 feet by 6 inches high, and was filled with secondary filter media 121.

A geo-textile mat 145 was placed over the entire system, and a layer of lava rock 147, followed by a layer of bark chips 141 was added. Plants 139 were installed over each stack of tires 111, and around the disposal bed 107.

Two testing ports were provided in the system, one at the downstream end of the disposal bed 107 and the other 18 inches downstream from the trickling filter 105. Primary waste water treatment occurred through a 1000 gallon septic tank 101 fitted with a four inch filter 103 manufactured under the trade name Zabel A1800. Normal waste water flow was established from common, everyday usage of the system by the property owners. After nine (9) months of use, the system was operating above expectations and no effluent passed completely through the system, and no waste water was observed at the downstream port. Observation of the system showed that the waste water passing through the system was evaporated, or used by the plants 139, by the time it reached the downstream end of the disposal bed 107.

Samples of waste water at the port eighteen inches downstream of the trickling filter 105 were taken, using general wastewater collection methods. Laboratory test results indicated levels of fecal coliform, BOD, nitrogen, phosphates and total suspended solids below the maximum allowed for waste water treated at a publically owned municipal treatment facility.

| Test results from experimental site taken from the test port 18 inches downstream from trickling filter 105 | | Missouri maximum allowable contamination present in treated waste water |
|---|---|---|
| Fecal Coliform | <10 cfu/100 mL | 1000 cfu/100 mL (per day) |
| BOD | 5 mg/L | 15 mg/L (ave. weekly limit) |
| pH | 6.66 | 6.5–9.0 |
| Suspended Solids | 6 mg/L | 20 mg/L (ave. weekly limit) |

Example 2

A 1,250 gallon two-compartment septic tank 101 was installed as the primary treatment for a single family residence. A mechanical filter 103 manufactured under the trade name Zabel A300 was installed downstream to the septic tank 101 in a secondary clarification chamber. A containment housing 109 was constructed downstream of the filter 103, with the trickling filter 105 portion 4.5 feet long, by 9 feet wide by 2 feet high. Twenty-four tires 111, in two rows stacked three high and filled with primary filter media 119 were installed.

As described herein, secondary media 121 was placed under, around and over the tires 111. A disposal bed 107 was constructed 9 feet wide by 20 feet long by 6 inches high and was filled with secondary filter media 121. Three test wells were used, one 2 feet downstream from the trickling filter 105, one near the middle of the disposal bed 107 and the third at the end of a 100 foot, 4 inch gravel-less drain pipe (lateral line) installed downstream from the disposal bed 107, as required by applicable county codes.

After 9 months of operation, not enough effluent passed from the trickle filter 105 to the disposal bed 107 to obtain testing samples.

Thus, there has been shown and described a novel apparatus and method for the secondary treatment of waste water, which fulfills all of the objects and advantages sought therefore. It will be apparent to those skilled in the art, however, that many changes, variations, modifications, and other uses and applications for the subject methods and compositions are possible, and also changes, variations, modifications, and other uses and applications which do not depart from the spirit and scope of the invention are deemed to be covered by the invention which is limited only by the claims which follow.

What is claimed is:

1. A method of constructing a biological waste water treatment and disposal system, comprising the steps of:

(1) installing a primary waste water treatment mechanism;

(2) excavating a site for a secondary trickling filter area and a tertiary disposal bed downstream from the secondary trickling filter area;

(3) constructing a containment housing having an intermediate wall therein between the secondary trickling filter area and the tertiary disposal bed;

(4) stacking a plurality of trickling support structures withing the secondary trickling filter area of the containment housing;

(5) filling the plurality of trickling support structures with a predetermined quantity of primary filter media;

(6) surrounding and overlying the plurality of trickling support structures with a predetermined quantity of secondary filter media;

(7) layering a predetermined quantity of secondary filter media in the tertiary disposal bed;

(8) constructing a distribution manifold adjacent to and overlying the plurality of trickling filter support structures, and attaching the distribution manifold to the primary waste water treatment mechanism; and (9) passing pre-treated waste water through the distribution manifold, onto the plurality of trickling filter support structures, through the primary filter media and the secondary filter media, and into the tertiary disposal bed.

2. The method of claim 1 including the step of covering the secondary trickling filter and the tertiary disposal bed with a geo-textile mat, a layer of ballast and a layer of tree bark chips.

3. The method of claim 2 including the step of planting green leafy plants on the secondary trickling filter and the tertiary disposal bed such that the plant roots extend downward through the geo-textile mat and into the primary filter media and the secondary filter media, and the leaves of the plant remain above the geo-textile mat.

* * * * *